Patented May 30, 1950

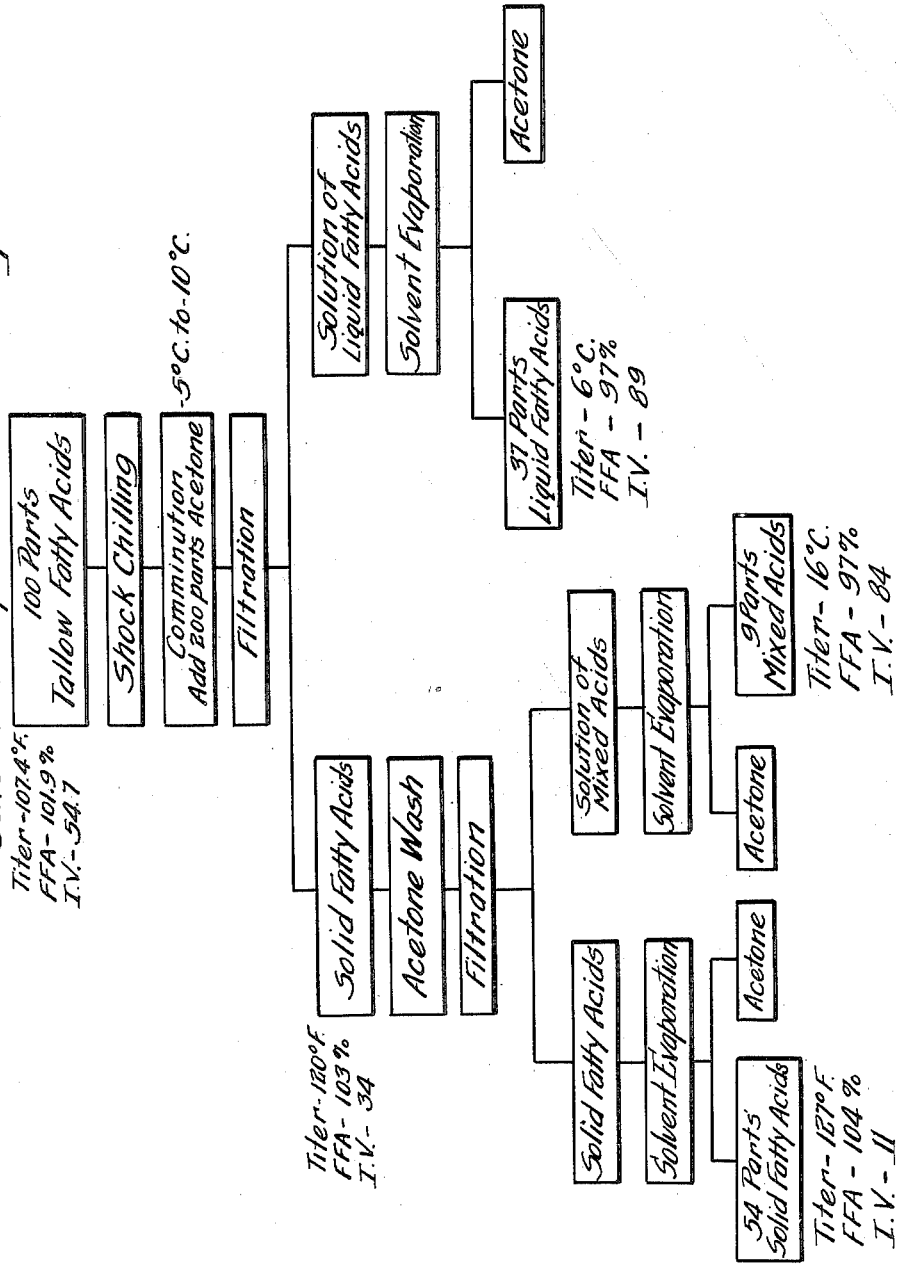

2,510,015

UNITED STATES PATENT OFFICE 2,510,015

METHOD OF SEPARATING HIGHER FATTY ACIDS

Norman V. Feldpush, Upper Darby, Pa., assignor to Wilson & Co., Inc., a corporation of Delaware Application April 1, 1946, Serial No. 658,745

5 Claims. (Cl. 260—419)

This invention relates to a method for separating mixed higher fatty acids from one another. In particular it relates to a method for separating mixed animal fatty acids into fractions, one a commercial grade of stearic acid and the other a commercial grade of oleic acid (red oil); and to a method for separating mixed vegetable fatty acids into fractions, one a solid fraction relatively rich in saturated acids and the other a liquid fraction relatively rich in unsaturated acids.

There are several prior art processes for separating mixed higher fatty acids into solid and liquid components. One of the oldest of these processes and which is presently being used involves the treatment of mixed fatty acids, preferably distilled, derived from natural fats, such as animal tallow and greases. In this process the mixed fatty acids, preferably distilled mixed fatty acids, while hot, are poured into aluminum pans and allowed to crystallize at room temperature. The fatty acids are cooled at a temperature in the order of about 30° to 36° F. to solidify them in cake form. The cakes of mixed fatty acids are wrapped in burlap bags and then cold-pressed in a hydraulic press at a pressure in the order of about 200 to 300 p. s. i. to squeeze out a substantial amount of the liquid unsaturated fatty acids present therein. These unsaturated acids are sold either as commercial red oil or commercial oleic acid.

The "bag stock" which remains in the burlap bags consists of the solid fatty acids and some of the liquid fatty acids. This stock is remelted, poured again into pans and allowed to crystallize and solidify at room temperature. The hard cakes of fatty acids are then put into hair bags and are pressed again at an elevated temperature above about 100° F. to remove more of the liquid fatty acids and some of the solid acids to form the mixture known as "foots." The residual cake from this pressing operation is again remelted, acid washed, bleached and processed as cake, flake, or bead form of commercial stearic acid.

A more recently developed process for separating mixed higher fatty acids into solid and liquid components and which is also being presently used involves the use of a solvent. In this process the hot, distilled mixed fatty acids are dissolved in 90% denatured aqueous methyl alcohol or other polar solvent miscible with water and the resulting solution is cooled slowly until the solid fatty acids precipitate in the form of large, filtrable crystals. The solid fatty acids are separated as by filtration and the solvent retained by the separated solid fatty acids is removed as by evaporation, leaving behind the stearic acid of commerce. The filtrate is flash distilled to evaporate the solvent and the residue is commercial red oil. The success of this process appears to depend upon the formation of large filterable crystals in the solution of the mixed fatty acids. Attempts have been made to improve the character of these crystals by the use of crystal promoters, for example a neutral fat, which provide foci at which the solid fatty acids crystals are formed during the slow cooling of the solution of the mixed higher fatty acids.

In accordance with the preferred aspects of the present invention, a shock chilled mixture of animal or vegetable fatty acids in comminuted at a low temperature. The comminuted particles of mixed fatty acids, whether obtained in the preferred manner or otherwise obtained, are then mixed with a solvent for the mixed higher fatty acids at a controlled low temperature so that solid fatty acid constituents of the mixture are insoluble or only sparingly soluble in the solvent, whereas liquid fatty acids constituents are substantially completely soluble therein. Solid fatty acids may then be separated from the solution of liquid fatty acids by filtration, centrifuging or otherwise.

As stated above, the success of the prior art processes utilizing a solvent to effect separation of the mixed higher fatty acids appears to depend upon the formation of large filterable crystals of solid fatty acids in the presence of a solvent for the mixed fatty acids. On the other hand, the process of the present invention, while utilizing a solvent for the mixed fatty acids to aid in effecting separation thereof, is independent of crystal formation in the presence of the solvent, for the operating temperature conditions of the process are maintained so low that solid fatty acids remain insoluble or only sparingly soluble in the solvent at all times, yet not so low as to prevent liquid fatty acids from dissolving and remaining in solution in the solvent. In consequence, solid fatty acids can be removed readily from the solution of liquid fatty acids, as by filtration, for example.

The criterion as to the character of the undissolved solid fatty acids present in the solution of the liquid fatty acids is that they be in a solidified form. This form may be obtained by preliminarily contacting warm mixed higher fatty acids with a cold surface to shock chill and solidify the mixture, or by permitting the warm mixed higher fatty acids to cool gradually at room temperature. The former procedure is preferred.

Regardless of how solidification of the mixed higher fatty acids is effected, the solidified mixture is ground or otherwise comminuted into minute particles under low temperature conditions. This comminution of the mixed higher fatty acids increases the surface areas and permits the solvent more readily to come into intimate contact with and to dissolve the liquid fatty acids, while the low temperature conditions utilized keeps the solid fatty acids insoluble in the solvent.

The subdivision of the mixed fatty acids into minute particles may be obtained by spraying warm mixed fatty acids under pressure through a nozzle into a cold medium such as a spraying tower, for example, maintained at a temperature in the order of about 0° C. to 5° C. The minute particles obtained in this manner are chilled and treated with a solvent to dissolve liquid fatty acids and leave solid fatty acids in an undissolved form and ready for filtration.

In carrying out the present invention in its preferred aspects, warmed mixed animal or vegetable fatty acids, preferably distilled mixed higher fatty acids, of a temperature in the order of about 60° to 70° C., are poured in a thin layer over a chilled surface, for example metal rolls or belts, maintained at a temperature of about 0° to 5° C., to shock chill the mixed fatty acids. The shock chilled fatty acids are flaked off the chilled surface and the flakes are comminuted, as by grinding, in any suitable comminuting device while maintaining the flakes at a temperature in the order of about −5° C. to about −15° C. The comminution is continued until the flakes are reduced to minute particles having a mesh in the order of about 10 to 300, or even smaller.

There is then added to the chilled particles of mixed fatty acids a solvent for the acids. This solvent may be a polar solvent or a non-polar solvent such as acetone, methyl ethyl ketone, nitromethane, methyl alcohol and the like, naphtha, pentane, hexane, benzene, xylene, the hydrogenated aromatic hydrocarbons such as hexalin, and the like, including the chlorinated hydrocarbons; or it may be a 50% mixture of methyl ethyl ketone and benzene. As is manifest, any mixture of materials which are solvents for the mixed fatty acids, may be used.

The solvent is first pre-chilled to a temperature in the order of about −10° to about −15° C., and then added slowly to the minute particles of mixed fatty acids and ground therein to form a homogeneous, pasty mass. For this purpose it is preferred to use slightly less than one part by weight of solvent to one part by weight of mixed fatty acids; however, other proportions of these materials may be used to form this paste, or, if desired, the formation of the paste may be dispensed with and the required amount of solvent added to dissolve the normally liquid fatty acids. The solvent and particles of mixed fatty acids may be contacted in a countercurrent operation, as is well understood, to effect solution of normally liquid fatty acids.

An alternate procedure for forming the paste is to comminute the chilled flakes of mixed fatty acids at the described low temperature while slowly adding portions of the chilled solvent. By this procedure the solvent is brought into contact with the liquid fatty acids as these acids are exposed by comminution.

When a paste is formed, additional solvent, also chilled to about −10° to −15° C., is then added to build up the solvent to fatty acid ratio to about 2:1. In this concentration of solvent the resulting mixture is in the form of a slurry and is in a condition best suitable for the separation of the solid fatty acids from the solution of the liquid fatty acids. Larger or smaller amounts of solvent may be used, of course, but for reasons pointed out the preferred ratio of solvent to fatty acid is about 2:1.

The intimate mixture of the solvent with the comminuted mixed fatty acids permits the solvent to come into contact with and dissolve the liquid fatty acids. Since the solid fatty acids are insoluble or only sparingly soluble at the mixing temperatures, they may be separated from the solution of the fatty acids by filtration. Commercial red oil is obtained by flash distilling the solvent from the filtrate.

The residual filter cake is removed from the filter and is washed with a solvent chilled to a temperature of about −10° to −15° C. It is preferred to maintain a solvent to fatty acid ratio in the order of about 2:1 in this washing operation. The wash solvent is removed from the filter cake by filtration and residual solvent is removed by evaporation, preferably under vacuum. The resulting washed filter cake is equivalent to a single pressed grade of commercial stearic acid. By subjecting this washed filter cake to a single retreatment in the process of the present invention, a product is obtained which is equivalent to a conventional double pressed grade of commercial stearic acid. Additional retreatments result in still higher grades of commercial stearic acid.

By operating in accordance with the present invention it is possible to produce a substantially zero degree C. titer red oil and commercial grades of stearic acid comparable to the best of the commercial grades of stearic acid produced by any of the prior art processes.

The filtrate obtained from the filtration of the washed filter cake is distilled to remove the solvent. The residue is a mixture of liquid and solid fatty acids and these may be and preferably are recycled for retreatment along with fresh distilled mixed fatty acids.

The invention will be fully understood from the following detailed examples of illustrative embodiments of the present invention, taken in conjunction with a schematic showing of the process of Example 1. While in this example the mixed fatty acids treated were derived from animal tallow, it is to be understood that mixed fatty acids derived from garbage grease, brown grease or other sources of mixed higher fatty acids, including synthetic mixtures thereof, may be similarly treated. In the examples and elsewhere throughout the specification, the term parts refers to parts by weight.

*Example 1*

100 parts of distilled tallow fatty acids with a titer of 107.4° F., free fatty acid of 101.9%, and an iodine value of 54.7 were heated to a temperature of about 60° to 70° C., and then poured over a metal surface which had been previously chilled to about 5° C. The shock chilled fatty acids were scraped off the chilled surface in the form of flakes and the flakes were transferred to a previously cooled pan maintained at a temperature of about −5° to −10° C., where they were permitted to remain until the temperature thereof had been lowered to at least about −5° C. The flakes of mixed fatty acids were then ground into minute particles having a mesh of about 40 to 300, and chilled acetone at a temperature of about −5° to −10° C. was added gradually until a uniform pasty mass was obtained. Then sufficient chilled acetone of a temperature of about −5° C. was added to build up about a 2:1 solvent ratio, thereby converting the mass into a slurry in which undissolved solid fatty acids were dispersed through a solution of liquid fatty acids.

The mixed fatty acid-solvent mixture was then filtered under vacuum (about 28 in.) to separate the solution of the liquid fatty acids in the acetone from the solid fatty acids and the filtrate was flash distilled to remove the solvent. The residue was a grade of red oil suitable for commercial use.

The filter cake of solid fatty acids, together with a small proportion of retained liquid fatty acids, was returned to the comminution pan and washed with acetone at a temperature of about −5° C. to −10° C., again using a solvent to fatty acid ratio of about 2:1. This fatty acid-solvent mixture was again filtered under vacuum (about 28 in.). The solvent was evaporated from the filtrate, and a mixed fatty acid fraction was recovered. The solvent was evaporated from the solid fatty acid filter cake and the residue consisted mainly of palmitic and stearic acids, and was of a character comparable to a conventional single pressed grade of stearic acid.

The analyses of the fatty acids from the above separation, the free fatty acids being calculated as oleic acid, are as follows:

|  | Yield | Titer | Iodine Value | Free Fatty Acid |
|---|---|---|---|---|
|  | Per cent | | | Per cent |
| Solid Fatty Acids | 54 | 127° F | 11 | 104 |
| Liquid Fatty Acids | 37 | 6° C | 89 | 97 |
| Mixed Fatty Acids | 9 | 16° C | 84 | 97 |

Substantially similar results were obtained by substituting hexane for the acetone in the foregoing experiment.

*Example 2*

The foregoing experiment was repeated with the operating temperature lowered to about −10° to −15° C. The yield of liquid fatty acids dropped from 37% to about 32% and the titer thereof was approximately 2° C. In similar experiments liquid fatty acids of a titer of about 1° C. were obtained.

*Example 3*

The solid fatty acids obtained from Example 1 were reprocessed as described in that example, except that the operating temperature was lowered to about −10° to −15° C. This operation produced solid fatty acids which are comparable to a conventional double pressed grade of commercial stearic acid. The analyses of the acids, the free fatty acids being calculated as oleic acid, are as follows:

|  | Yield | Titer | Iodine Value | Free Fatty Acid |
|---|---|---|---|---|
|  | Per Cent | | | Per cent |
| Solid Fatty Acids | 81 | 129° F | 7 | 105 |
| Liquid Fatty Acids | 12 | 11° C | 90 | 97 |
| Mixed Fatty Acids | 7 | 25° C | 75 | 100 |

Vegetable fatty acids can be readily separated into solid and liquid components by the process described above. Thus, for example, it is possible to produce solid acid fractions relatively rich in saturated acids, and low titer unsaturated liquid acids from distilled cottonseed fatty acids or from distilled soya bean fatty acids, or from any other source of vegetable fatty acids, including vegetable fats.

*Example 4*

100 parts of distilled cottonseed fatty acids, with a titer of 36.4° C., free fatty acid of 100.1 and an iodine value of 100, were processed in the same manner as the tallow fatty acids, at a temperature of about −5° to −10° C. The analyses of the fatty acids from the separation, the free fatty acids being calculated as oleic acid, are as follows:

|  | Yield | Titer | Iodine Value | Free Fatty Acid |
|---|---|---|---|---|
|  | Per cent | ° C. | | Per cent |
| Solid Fatty Acids | 44 | 50.2 | 28.3 | 104 |
| Liquid Fatty Acids | 47 | 4 | 125.3 | 97 |
| Mixed Fatty Acids | 9 | 16 | 115.0 | 98 |

*Example 5*

The solid fatty acids from Example 4 were reprocessed as described in that example. The analyses of the fatty acids, the free fatty acids being calculated as oleic acid, are as follows:

|  | Yield | Titer | Iodine Value | Free Fatty Acid |
|---|---|---|---|---|
|  | Per cent | ° C. | | Per cent |
| Solid Fatty Acids | 83 | 52 | 17 | 106 |
| Liquid Fatty Acids | 10 | 15 | 86 | 97 |
| Mixed Fatty Acids | 7 | 25 | 71 | 98 |

The present invention is not to be construed as limited to the details of the illustrative embodiments, except in so far as these details are included within the scope of the appended claims. The mixed higher fatty acids of the specification and claims include all natural sources of mixed higher fatty acids, specifically in addition to those named above, those derived from marine oils including marine animal oils such as whale oil. They also include the mixtures of fatty acids which are known as commercial stearic acid, for stearic and palmitic acids may be separated therefrom in accordance with the present invention. The fatty acids derived from marine oils are conventionally referred to as "fish oil fatty acids."

It is to be understood that the liquid unsaturated higher fatty acids referred to in the specification and claims are those higher fatty acids which are liquid at room temperature. These higher fatty acids may actually be in a solidified state at the temperature at which the solvent is added in accordance with the present invention, yet at this temperature they are soluble in the solvent whereas the normally solid saturated higher fatty acids are not.

In general, the best results are obtained in accordance with the present invention when the comminuted mixed fatty acids and the solvent are contacted at a temperature in the order of from about −5° to −15° C., as pointed out above. This temperature range is not critical nor is it necessarily the temperature range which is optimum for every solvent or every starting material which may be used in accordance with the present invention. In general, a criterion for the temperature at which the mixed fatty acids and solvent are contacted is that the temperature be at least low enough that the liquid fatty acid constituents of the mixture are preferentially soluble in the solvent. The optimum temperature is that temperature where a minimum quantity of the solid fatty acid constituents are soluble in the solvent. For example, when the process was conducted with acetone at −5° to −10° C., as pointed out above, the titer of the solid fatty acids was 127° F. and the titer of the liquid fatty acids was 6° C. With the same starting material and with the process conducted with acetone at 0° to 5° C., the titer of the solid fatty acids was 121° F. and the titer of the liquid fatty acids was 18° C.

I claim:

1. A method of separating normally liquid unsaturated higher fatty acids and solid saturated higher fatty acids from a mixture of the same, comprising comminuting said mixture of fatty acids while in a solid state to particles having a mesh in the order of about 10 to about 300 at a temperature of about −5° to −15° C. in the presence of a solvent for said mixture of fatty acids in an amount to provide a ratio of solvent to fatty acids in the order of about 2:1, and thereby preferentially dissolve said liquid fatty acid constituents in the said solvent, and separating undissolved solid fatty acids from the solution of liquid fatty acids.

2. A method of separating normally liquid unsaturated higher fatty acids and normally solid saturated fatty acids from a mixture of the same which comprises contacting prechilled solidified particles of said mixture of fatty acids having a size of from about 10 to 300 mesh with a solvent therefor at a temperature of from 0° C. to −10° C., the temperature of prechilling of said particles being approximately that of such contacting, and separating undissolved fatty acids from the solution of liquid fatty acids.

3. A method of separating normally liquid unsaturated higher fatty acids and normally solid saturated fatty acids from a mixture of the same which comprises contacting prechilled solidified particles of said mixture of fatty acids of a size of from about 10 to about 300 mesh with a solvent therefor at a temperature of about −5° to −15° C. to preferentially dissolve said liquid fatty acids in the said solvent, the temperature of prechilling of said particles being approximately that of such contacting, and separating undissolved fatty acids from the solution of liquid fatty acids.

4. A method of separating normally liquid unsaturated higher fatty acids and normally solid saturated fatty acids from a mixture of the same which comprises contacting prechilled solidified particles of said mixture of fatty acids of a size of from about 10 to 300 mesh with a solvent therefor in a ratio of approximately 2 parts solvent to 1 of fatty acid mixture and at a temperature of about −5° C. to −15° C. to preferentially dissolve said normally liquid fatty acid constituents in the said solvent, the temperature of prechilling of said particles being approximately that of such contacting, and separating undissolved solid fatty acids from the mixture.

5. A method of separating normally liquid unsaturated higher fatty acids and solid saturated fatty acids from a mixture of the same comprising contacting prechilled solidified particles of said mixture of fatty acids of a size of from about 10 to about 300 mesh with a solvent therefor at a temperature of about −5° C. to −15° C. to preferentially dissolve said liquid fatty acid constituents in the said solvent, the temperature of prechilling of said particles being approximately that of such contacting and the amount of said solvent being sufficient to form with the particles of fatty acids a uniform pasty mass, adding additional amounts of said solvent to the pasty mass to convert the same into a slurry containing liquid unsaturated fatty acid constituents in solution in said solvent, such additional amounts of solvent being precooled to a temperature approximately that of the contacting temperature, and separating undissolved fatty acids from the slurry.

NORMAN V. FELDPUSH.

REFERENCES CITED

The following references are of record in the file of this patent:

UNITED STATES PATENTS

| Number | Name | Date |
|---|---|---|
| 2,012,106 | Mauersberger | Aug. 20, 1935 |
| 2,113,960 | Grote et al. | Apr. 12, 1938 |
| 2,293,676 | Myers et al. | Aug. 18, 1942 |
| 2,298,501 | Myers et al. | Oct. 13, 1942 |

OTHER REFERENCES

Foreman et al., Oil & Soap, July 1944 pp. 183–187.

Certificate of Correction

Patent No. 2,510,015 May 30, 1950

NORMAN V. FELDPUSH

It is hereby certified that errors appear in the printed specification of the above numbered patent requiring correction as follows:

Column 2, line 18, for the words "acids in" read *acids is*; column 7, line 38, and column 8, line 9, for "to 300 mesh" read *to about 300 mesh*;

and that the said Letters Patent should be read with these corrections therein that the same may conform to the record of the case in the Patent Office.

Signed and sealed this 29th day of August, A. D. 1950.

[SEAL]

THOMAS F. MURPHY,
*Assistant Commissioner of Patents.*